(12) United States Patent
Anselment et al.

(10) Patent No.: US 9,141,840 B2
(45) Date of Patent: Sep. 22, 2015

(54) APPARATUS FOR DEFLECTING AND FOR WIDENING A VISIBLE RANGE

(71) Applicant: SICK AG, Waldkirch (DE)

(72) Inventors: Christoph Anselment, Waldkirch (DE);
Helmut Weber, Waldkirch (DE);
Johannes Aschenbrenner, Waldkirch (DE); Christofer Roser, Waldkirch (DE); Norbert Schnurr, Waldkirch (DE); Dirk Strohmeier, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 14/505,638

(22) Filed: Oct. 3, 2014

(65) Prior Publication Data

US 2015/0108218 A1    Apr. 23, 2015

(30) Foreign Application Priority Data

Oct. 18, 2013  (EP) ..................................... 13189372

(51) Int. Cl.
*G06K 7/10* (2006.01)
*G06K 7/14* (2006.01)
(Continued)

(52) U.S. Cl.
CPC .............. *G06K 7/10831* (2013.01); *G02B 5/09* (2013.01); *G02B 7/182* (2013.01); *G02B 26/0816* (2013.01); *G02B 27/143* (2013.01); *G06K 7/10722* (2013.01); *H04N 7/18* (2013.01)

(58) Field of Classification Search
CPC ............. G06K 7/10; G06K 7/14; G06K 5/00; G06K 15/12; G02B 26/08; G02B 5/00; G02B 26/12; G02B 26/00; G03B 7/08

USPC .................. 235/454, 462.22, 462.32, 462.24, 235/462.39, 462.41
See application file for complete search history.

(56) References Cited

U.S. PATENT DOCUMENTS 5,708,470 A    1/1998  Holford
5,870,219 A *  2/1999  Plesko ........................ 359/199.1
(Continued)

FOREIGN PATENT DOCUMENTS

CA         1073715      3/1980
EP       2004070302     3/2004
(Continued)

OTHER PUBLICATIONS

European Patent Application No. 13189372.9, Search Report dated Feb. 20, 2014, eight (8) pages.
(Continued)

*Primary Examiner* — Edwyn Labaze
(74) *Attorney, Agent, or Firm* — Nath, Goldberg & Meyer; Jerald L. Meyer; Rury L. Grisham

(57) ABSTRACT

An apparatus (10) for deflecting and for widening a visible range of a camera (24) is provided, wherein the apparatus (10) has a first mirror element (12) which is tilted with respect to the optical axis of the camera (24) in a longitudinal direction in order to supply light to the camera (24) from a visible range lying laterally with respect to the optical axis. In this connection the first mirror element (12) is additionally tilted in a transverse direction perpendicular to the longitudinal direction and the apparatus has a second mirror element (14) besides the first mirror element (12) which is tilted in the longitudinal direction and in the transverse direction with respect to the first mirror element (12).

18 Claims, 4 Drawing Sheets

Figure 1:
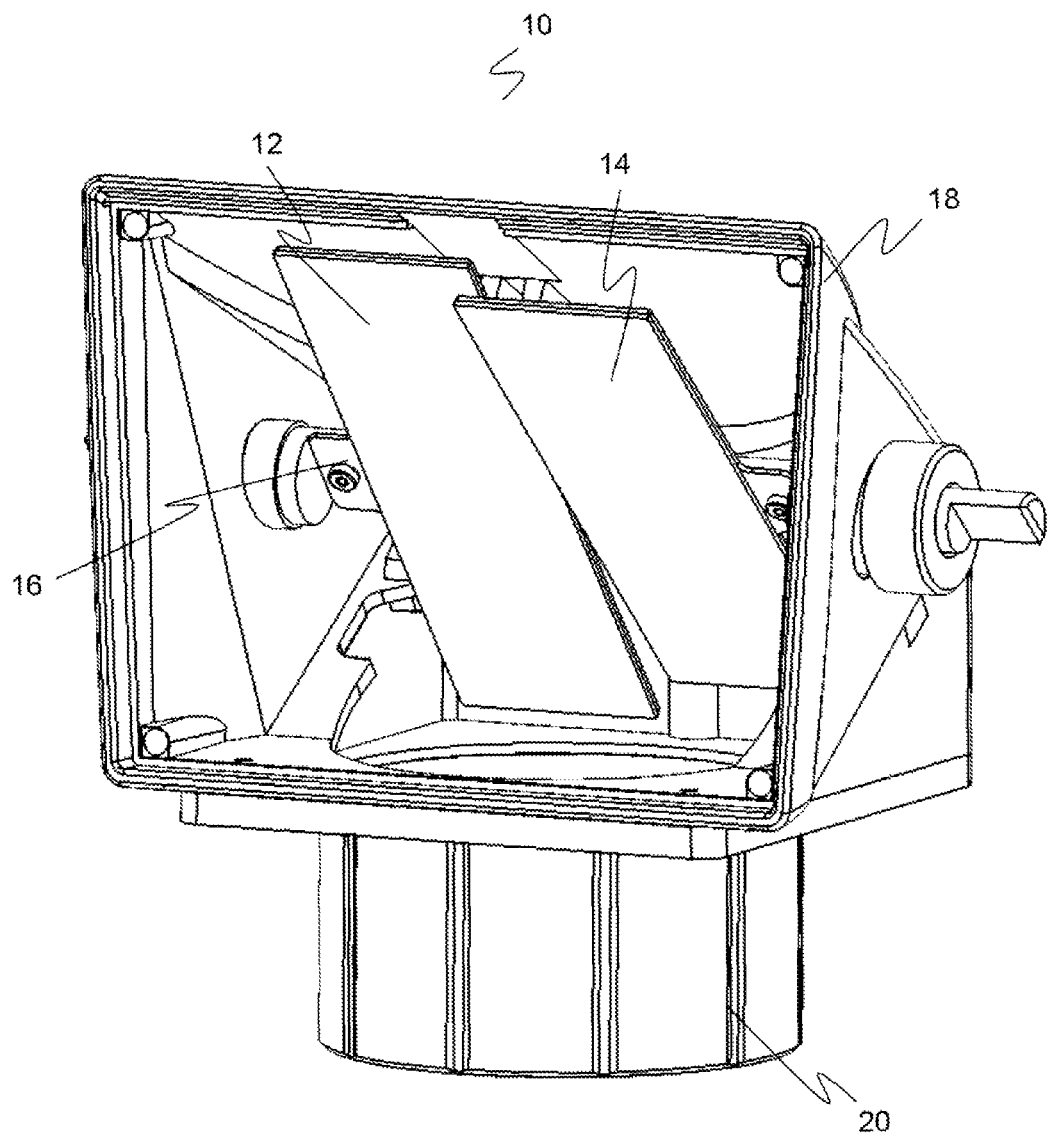

(51) Int. Cl.
   *G02B 27/14* (2006.01)
   *H04N 7/18* (2006.01)
   *G02B 5/09* (2006.01)
   *G02B 7/182* (2006.01)
   *G02B 26/08* (2006.01)

(56) References Cited

U.S. PATENT DOCUMENTS

2009/0127341 A1* 5/2009 Feng .................. 235/462.08
2009/0323149 A1* 12/2009 Mizukami et al. ......... 359/221.2
2010/0163622 A1* 7/2010 Olmstead ................ 235/454
2012/0261473 A1 10/2012 Bombaugh et al.

FOREIGN PATENT DOCUMENTS

EP          2624042 A2   8/2013
JP          08171152     7/1996

OTHER PUBLICATIONS

European Patent Application No. 13189372.9, Exam Report dated Apr. 23, 2014, three (3) pages.

* cited by examiner

APPARATUS FOR DEFLECTING AND FOR WIDENING A VISIBLE RANGE

The invention relates to an apparatus for deflecting and for widening a visible range, as well as to a corresponding method for recording an image from a widening visible range in accordance with the preamble of the respective independent claim.

In industrial applications cameras are used in a plethora of ways in order to automatically detect object properties, for example, for the inspection of objects or for the measurement of objects. In this connection, images of the objects are recorded and are evaluated in accordance with the task, by image processing methods. A further application of cameras is the reading of codes. Such camera-based code readers are successively taking over from the still widely used bar code scanners. With the aid of an image sensor objects having codes present thereon are recorded, the code regions are identified in the images and are then decoded. Camera-based code readers can, without a problem, also process other kinds of codes other than one dimensional codes which are assembled like a matrix code also in two dimensions and make available more information.

A frequent situation of detection is the assembly of the camera above a conveyor belt, where further processing steps are initiated in dependence on the obtained object properties. Such processing steps, for example, exist with respect to the further processing at a machine adapted to a specific object, the machine acting on the conveyed object or on a change of the object flow in that certain objects are excluded from the object flow in the framework of a quality control or in that the object flow is sorted into a plurality of part object flows.

The detection region of a common camera is frequently not sufficient in order to cover the complete desired width, in particular of a conveyor belt. In a known alternative, a plurality of cameras are mounted next to one another. This indeed solves the problem, but requires a considerable increase in demand in effort and cost for the plurality of cameras, as well as with regard to their assembly and coordination.

The EP 2 624 042 A1 discloses a system for the viewing field widening of a camera. For this purpose, a module having four mirrors is placed onto the camera. Two outer mirrors catch the light from a widened visible range and deflect this via internal mirrors onto the image sensor. Each pair of outer and inner mirrors records a strip of the visible range. In this connection, the mirrors are tilted in such a way that the two strips lie next to one another in the object region in order to cover a wider width, however, are imaged at the image sensor on top of one another. The module is primarily configured for the detection of a visible range which is present in the direction of the optical axis of the camera. A variant is further also suggested in a similar manner, which is based on four mirrors, in which the visible range is detected at a 90° shift. The disadvantage of this solution is the mirror construction which is demanding in effort and cost.

It is moreover known to arrange a simple deflection cover having a mirror tilted by 45° in front of a code reader in order to enable a detection at an angle of 90°. In this way, the deflection is only exclusively achieved, but a viewing field widening is in this connection not provided.

For this reason, it is the object of the invention to widen the visible range of a camera.

This object is satisfied by an apparatus for deflecting and for widening a visible range, as well as by a corresponding method for the recording of an image from a widened visible range. The apparatus starts from an image deflection, this thus comprises a mirror in order to detect a visible range which is not shifted in a forward direction along the optical axis of the camera, but in contrast thereto is laterally displaced by an angle. For this purpose, the mirror is tilted in a longitudinal direction.

In accordance with a first alternative the invention then starts from the basic idea of using two mirror elements arranged next to one another, but tilted differently with respect to one another. The different angle of tilt in the longitudinal direction leads to the desired widening of the viewing field as the two-part regions detected by the mirror elements complement one another in order to detect the required viewing field width. This can be achieved by up to at most twice the width of a part region, this means of the actual viewing field width of the camera, but does not have to be ideally used in order to maintain an overlap region. Through an additional tilting of the mirror elements in a transverse direction it can be achieved that the two-part regions directly transition into one another in the object region, this means transition into one another without a lateral displacement. Thus, two-part regions lying behind one another in the object region are detected above one another in the camera.

In accordance with a second alternative only one mirror element is provided which changes between two positions with the aid of a tilting apparatus. In these two positions it satisfies precisely the same function as one of the two of the mirror elements respectively arranged next to one another in accordance with the first alternative. Thus, for example, in an alternating manner, the left hand part and the right hand part of the visible range are thus detected with a time shift. In principle, a tilting only in the longitudinal direction is sufficient for this. In that a tilting in the transverse direction is additionally brought about, there is however no lateral displacement between the left hand part and the right hand part on a suitable selection of this tilt.

The invention has the advantage that the viewing field of a camera is significantly widened. Figuratively speaking the apparatus in accordance with the invention ensures that a camera having a typical matrix sensor, for example in the format 4/3 or 16/9, effectively becomes a camera having an extreme wide image format, for example, in order to cover wider conveyor belts over their complete width. In this connection, the apparatus having merely two mirrors can be of a very simple design and thereby cost-effective, low in maintenance and can easily be adjusted.

The first mirror element and the second mirror element are preferably tilted in the longitudinal direction by 20°-70° in particular by 40°-50° or substantially by 45° with respect to the optical axis of the camera. The camera is correspondingly tilted by the double angle with respect to the detected visible range and this orientation depends on the application. Frequently, one wants to tilt the camera precisely by 90°, this means it is, for example, aligned with its optical axis in parallel to a conveyor belt and the apparatus ensures a 90° deflection. In this connection, deviations of a few degrees are possible. Due to the mutual tilting in the longitudinal direction both mirror elements can in any way not be tilted by precisely 45°, but are tilted by approximately 45° with respect to the camera. The angle of tilt can furthermore, depend on geometric conditions of the recording situation, such as the object distance and the desired viewing field width, as well as on the required degree of overlap of the two-part regions recorded by the mirror elements.

The first mirror element and the second mirror element are preferably tilted in the transverse direction by the same amount, but in different directions. Thereby, the two mirror elements face one another in the transverse direction in a wedge-shaped manner and record laterally centrally arranged part regions. The tilting in the transverse direction does not necessarily have to satisfy these conditions, but leads to a kind of squinting with respect to a visible range lying displaced in the transverse direction.

The first mirror element and the second mirror element preferably form mirror surfaces of like geometry. The mirrors are in this way optically of like effect, and even more preferably also mirrors of like design which only differ from one another with respect to their tilting. Thereby, also like part regions are recorded which simplifies the further processing of the image data of the visible range.

The apparatus preferably has a third mirror element which is tilted with respect to the first mirror element and the second mirror element is tilted in the longitudinal direction and in the transverse direction. The width of the viewing field is thus divided not into two, but into three sections which lie behind one another in the object region and on top of one another in the camera. This can selectively be utilized in order to detect an even wider viewing field or to create a larger overlap region. Following this same basic idea also a plurality of further mirror elements can be provided.

The apparatus preferably has a housing having a connection element in order to be releasably connected as a cover to a camera. Thereby, a camera can subsequently be retrofitted for a wider viewing field. As an alternative to a releasable connection the apparatus can already be fixedly connected to the camera in the works or the housing of the apparatus can even be a part of the camera housing.

In a preferred embodiment a camera is provided which is equipped with an apparatus for the viewing field widening in accordance with the invention.

Such a camera preferably has an illumination apparatus whose light is deflected into the visible range via the mirror elements in order to illuminate the visible range. The illumination thus uses the same mirror elements as the received light. Thereby, the visible range is also widened for an actively illuminated camera without a change having to be made at the illumination. The apparatus automatically also ensures for its illumination with the widening of the visible range.

The camera preferably has an evaluation unit in order to combine a part region of the visible range recorded via the first mirror element and a part region recorded via the second mirror element to a common image of the widened viewing field. The part images arranged on top of one another at the image sensor of the camera are thereby connected to a common image. The camera thereby becomes a camera having a widened image format and the operator does not have to consider the part regions after a suitable initial adjustment of the mirror elements.

The camera is preferably configured as a camera-based code reader having a decoding unit for the identification of code regions and for the readout of code content. Due to the widening of the visible range this code reader covers a wider reading field, in particular a wider conveyor belt.

The method in accordance with the invention can be furthered in a similar manner and in this connection shows similar advantages. Such advantageous features are described by way of example but not conclusively in the dependent claims adjoining the independent claims.

Figure 2:
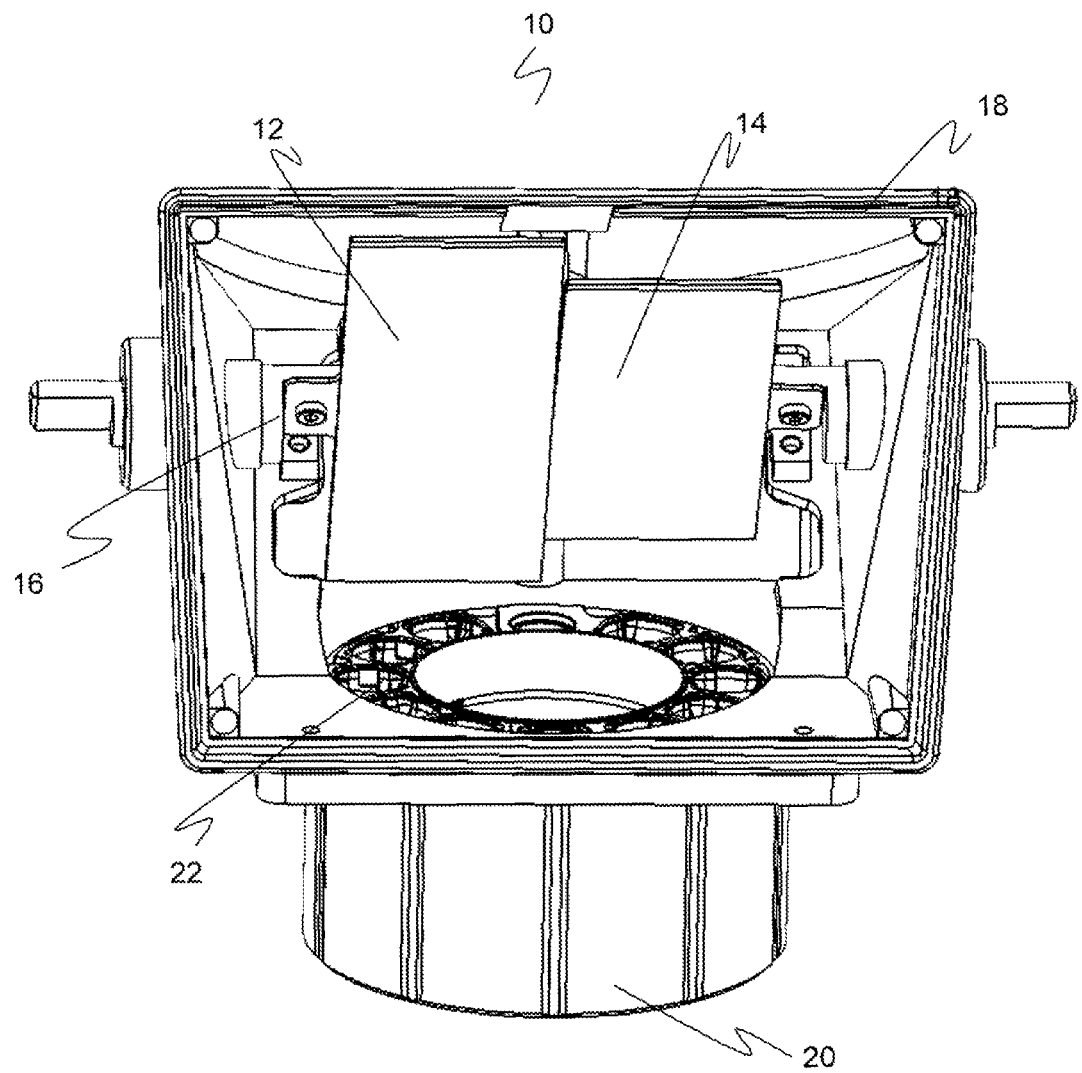
Figure 3:
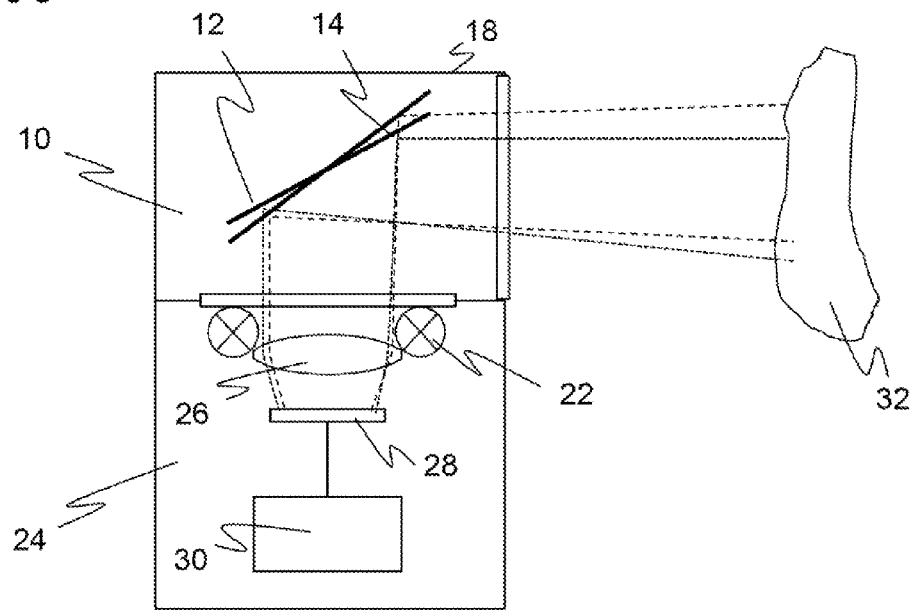
Figure 4:
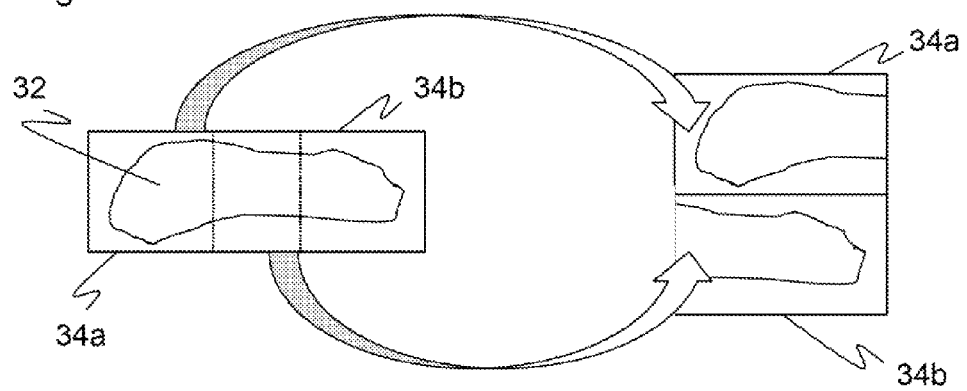
Figure 5:
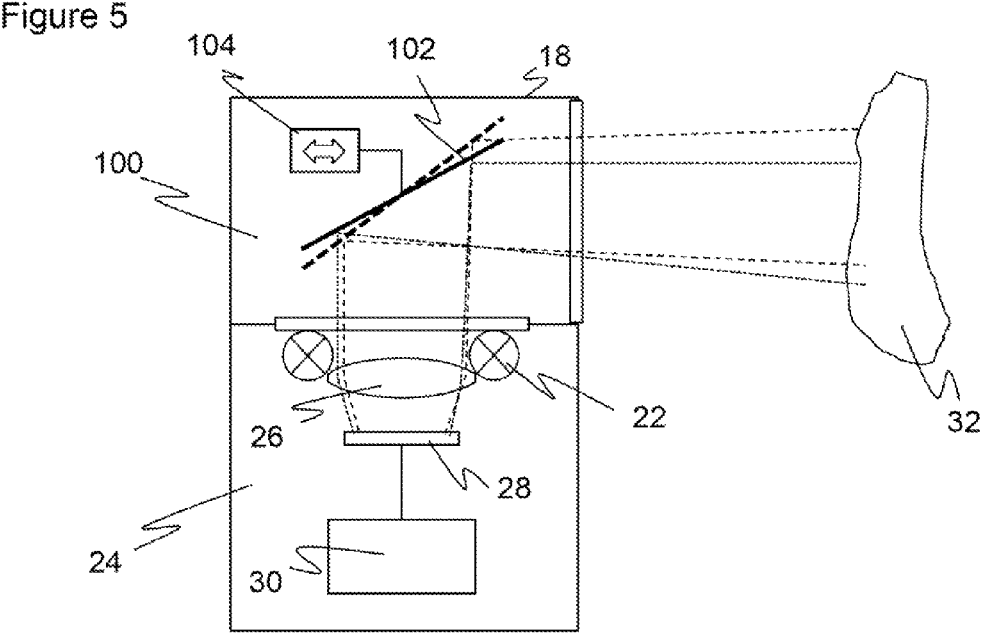

The invention will be described in the following in detail also with respect to further features and advantages by way of example by means of embodiments and with reference to the submitted drawing. The images of the drawing shown in:

FIG. 1 a three-dimensional view of an apparatus for deflecting and for widening the visible range of a camera;

FIG. 2 a three-dimensional view like FIG. 1, but having an illumination;

FIG. 3 a schematic sectional illustration of a camera having an apparatus in accordance with FIG. 2;

FIG. 4 an exemplary widened visible range of a camera and its imaging in the camera; and FIG. 5 a schematic sectional illustration of a camera having a further embodiment of an apparatus for deflecting and for widening a visible range.

FIG. 1 shows a three-dimensional view of an image deflection cover respectively an apparatus 10 for deflecting and for widening a visible range of a camera. The apparatus 10 has a first mirror element 12 and a second element 14 lying next to one another. The two mirror elements 12, 14 are mounted at a shaft 16 which in turn is held in a housing 18. The housing 18 simultaneously serves the mechanical stability and as an optical screen. A connection element 20 is provided in the lower part of the housing 18 in order to connect the apparatus 10 to a camera, such that its objective is aligned with its optical axis onto the mirror elements 12, 14. The optical axis in the perspective of FIG. 1 extends from below to the top, wherein the mirror elements 12, 14 ensure an image deflection by approximately 90°, such that the effective viewing field of the camera lies above the plane of the paper.

The mirror elements 12, 14 can be tilted independent of one another in two axes. A tilting in a longitudinal direction can clearly be seen in FIG. 1. The angle of tilt amounts to approximately 45°, in order to achieve the desired 90° image deflection. The angle of tilt however deviates from precisely 45°, as the two mirror elements 12, 14 are also tilted with respect to one another in the longitudinal direction. Thereby, the mirror elements 12, 14 are aligned onto part regions in the object region which lie at different heights in the perspective of FIG. 1. In an actual application, the apparatus 10 would typically be aligned in such a way that the height direction of the FIG. 1 corresponds to a detected width, for example, of a conveyor belt. The two-part regions complement one another and thus cover a larger width. The different angles of tilt in the longitudinal direction of the two mirror elements 12, 14 are preferably aligned in dependence on an object spacing with respect to the desired width to be detected. A certain overlap of the part regions is possible and, for example, even desired for the stitching to a common image.

However, the two-part regions would then still have a lateral mutual displacement. For this reason, the mirror elements 12, 14 are also tilted in the transverse direction perpendicular to the longitudinal direction. The two mirror elements 12, 14 are tilted with respect to one another for this purpose and form a wedge. However, the wedge angle is very small and for this reason can hardly be recognized in FIG. 1. Through the tilting in the transverse direction, the part regions are aligned in such a way that they lie at a common axis, the corresponding part images thus only just transition into one another over the width of the visible range. In this way, a continuous region is imaged transverse to the conveying direction.

FIG. 2 shows a three-dimensional view of a further embodiment of the apparatus 10. As is true for the complete description, the same reference numerals describe the same features. Apart from the slightly different perspective this illustration differs from FIG. 1 thereby that an illumination apparatus 22 is additionally provided, in the present instance, by way of example, in the form of LEDs provided in a ring-like manner about an opening for the objective of a camera. The light of this illumination apparatus 22 is guided by the apparatus 10 in precisely the same way to the visible range, as it is deflected and widened on the reversed light path of the visible range of the camera.

In a schematic sectional view FIG. 3 shows a camera 24 having an apparatus 10 for the viewing field widening. The camera 24 has the illumination apparatus 22, an objective and/or a receiver optics 26, an image sensor 28 having light sensitive reception elements arranged in a matrix like manner and a control and evaluation unit 30. The camera 24 is in particular a camera-based code reader whose evaluation unit 30 identifies code regions in the recorded image data and can read out the code content. The evaluation unit 30 is moreover preferably in the position to stitch a plurality of recorded part regions or image strips to a common image.

The camera 24 records an object 32 present in two-part regions via the mirror elements 12, 14, wherein the respective light path over the two mirror elements 12, 14 are indicated by different line widths. The shift of the part regions arising at the object 32 can be smaller than or larger than illustrated, this depends on the mutual angle of tilt of the mirror elements 12, 14 and on the spacing to the object 32. The additional tilt of the mirror elements 12, 14 cannot be recognized in FIG. 3 due to the sectional view. This has the effect that the two-part regions coincide at the object 32 in the lateral direction, this means in FIG. 3 along one of the perpendiculars with respect to a plane of the paper.

The effect of the apparatus 10 on the image of the camera 24 is illustrated by way of example in FIG. 4. At the left hand side the object region is illustrated where the two-part regions 34a-b lie displaced with respect to one another and next to one another due to the tilt of the mirror elements 12, 14 in the longitudinal direction and thus cover a larger width. However, in the lateral direction the part regions 34a-b coincide due to a suitable tilting of the mirror elements 34a-b in the transverse direction, this means they directly transition into one another. As a result the two-part regions 34a-b cover a widened viewing field.

In contrast to this, the part regions 34a-b are imaged on top of one another in the image region and/or at the image sensor 28, as is illustrated on the right hand side in FIG. 4. In this way one can use a common image sensor 28 and/or a reception optics 26 having a more quadratic and common aspect ratio of, for example, 4/3 or 16/9 and a very wide image format can still be achieved. Through a subsequent image processing in the evaluation unit 30 or externally, it is possible without further ado to stitch the two-part regions 34a-b next to one another. On the other hand, it is also plausible to leave the overlap regions imaged in the two image regions 34a-b so large that a recorded code of known size is always completely detected in at least one of the part regions 34a-b. Then a stitching to a homogeneous image for decoding is not even required.

FIG. 5 shows a sectional view of a camera 24 having a further embodiment of an apparatus 100 for deflecting and for widening the visible range of the camera 24, in contrast to the so far described embodiments, only one mirror element 102 is provided in this instance which can, however, be tilted with the aid of a tilting unit 104. This is respectively indicated by way of illustration of the mirror element 102 having a continuous line and a dotted line. The mirror element 102 is thus alternatingly or cyclically tilted between two end positions, wherein the mirror element 102 substantially stands in the one position like the first mirror element 12 and in the other position like the second mirror element 14 of the embodiment in accordance with FIGS. 1 to 3. The two-part regions 34a-b are then not simultaneously recorded but are alternatingly recorded and recorded displaced in time. The tilting in the transverse direction can deviate slightly from that shown in accordance with FIGS. 1 to 3 in order to compensate an advance in feed between two recordings. It is principally also plausible that the mirror element 102 is only tilted in the longitudinal direction and not in the transverse direction. Thereby, the viewing field is likewise widened, however a shift of the part regions 34a-b in the lateral direction, this means in the feed direction, remains.

What is claimed is:

1. An apparatus for deflecting and for widening a visual range of a camera, the apparatus comprising:
   a first mirror element which is tilted with respect to an optical axis of the camera in a longitudinal direction in order to guide light to the camera from a first visible range lying laterally with respect to the optical axis, and additionally tilted in a transverse direction perpendicular to the longitudinal direction; and
   a second mirror element disposed adjacent to the first mirror element, the second mirror element being tilted in the longitudinal direction in order to guide light to the camera from a second visible range lying laterally with respect to the optical axis, and additionally tilted in the transverse direction with respect to the first mirror element,
   wherein an overlap region is formed on the first visible range and the second visible range, and
   wherein the overlap region entirely covers a code to be read.

2. The apparatus in accordance with claim 1,
   wherein the first mirror element and the second mirror element are tilted with respect to the optical axis of the camera in the longitudinal direction by 20°-70°.

3. The apparatus in accordance with claim 2,
   wherein the first mirror element and the second mirror element are tilted with respect to the optical axis of the camera in the longitudinal direction by 40°-50°.

4. The apparatus in accordance with claim 3,
   wherein the first mirror element and the second mirror element are tilted with respect to the optical axis of the camera in the longitudinal direction by 45°.

5. The apparatus in accordance with claim 1,
   wherein the first mirror element and the second mirror element are tilted in the transverse direction by the same amount, but in different directions.

6. The apparatus in accordance with claim 1,
   wherein the first mirror element and the second mirror element form mirror surfaces having the same geometry.

7. The apparatus in accordance with claim 1,
   wherein the apparatus has a third mirror element which is tilted with respect to the first mirror element and with respect to the second mirror element in the longitudinal direction and in the transverse direction.

8. The apparatus in accordance with claim 1,
   wherein the apparatus has a housing having a connection element in order to be releasably connected to a camera as a cover.

9. The apparatus in accordance with claim 1, wherein tilting of the first mirror element and the second mirror element in the transverse direction causes the first visible range to be displayed above the second visible range within an image domain.

10. A camera having an apparatus for deflecting and for widening a visual range of the camera, wherein the apparatus has comprises:
    a first mirror element which is tilted with respect to an optical axis of the camera in a longitudinal direction in order to guide light to the camera from a first visible range lying laterally with respect to the optical axis, and additionally tilted in a transverse direction perpendicular to the longitudinal direction; and a second mirror element disposed adjacent to the first mirror element, the second mirror element being tilted in the longitudinal direction in order to guide light to the camera from a second visible range lying laterally with respect to the optical axis, and additionally tilted in the transverse direction with respect to the first mirror-element element, wherein an overlap region is formed on the first visible range and the second visible range, and wherein the overlap region entirely covers a code to be read.

11. The camera in accordance with claim 10, which has an illumination apparatus whose light is deflected via the mirror elements into the visible range in order to illuminate the visible range.

12. The camera in accordance with claim 10, which has an evaluation unit in order to combine a first part region of the visible range recorded via the first mirror element and a second part region of the visible range recorded via the second mirror element to a common image of the widened visible range.

13. The camera in accordance with claim 10, which is configured as a camera-based code reader having a decoding unit for the identification of code regions and for the read out of code contents.

14. The camera in accordance with claim 10, wherein tilting of the first mirror element and the second mirror element in the transverse direction causes the first visible range to be displayed above the second visible range within an image domain.

15. An apparatus for deflecting and for widening a visible range of a camera, the apparatus comprising:

a mirror element which, in a first position, is tilted in a longitudinal direction with respect to the optical axis of the camera to guide light from a first visible range lying laterally with respect to the optical axis to the camera, and additionally tilted in a transverse direction perpendicular to the longitudinal direction; and a tilting unit configured to tilt the mirror element alternatingly into the first position and into a second position in which the mirror element is tilted with respect to the first position in the longitudinal direction and in the transverse direction, in order to guide light from a second visible range lying laterally with respect to the optical axis to the camera, wherein an overlap region is formed on the first visible range and the second visible range, and wherein the overlap region entirely covers a code to be read.

16. The apparatus in accordance with claim 15, wherein tilting in the transverse direction causes the first visible range to be displayed above the second visible range within an image domain.

17. A method for the recording of an image from a widened visible range using a camera in which light is supplied to the camera via a mirror element from first and second visible ranges lying laterally with respect to the optical axis, the method comprising:

tilting the mirror element in a transverse direction perpendicular to a longitudinal direction;

tilting a further mirror element which with respect to the mirror element in the longitudinal direction and in the transverse direction; and simultaneously or successively recording the image in two-part regions via the mirror element and via the further mirror element in two different positions in that the mirror element is differently tilted in the longitudinal direction and in the transverse direction, wherein an overlap region is formed on the first visible range and the second visible range, and wherein the overlap region entirely covers a code to be read.

18. The method in accordance with claim 17, further comprising displaying the first visible range above the second visible range within an image domain.

* * * * *